United States Patent
Brown et al.

[15] 3,648,930
[45] Mar. 14, 1972

[54] CHEMICAL SOLUTION SPRAY SYSTEM FOR SELF-PROPELLED SPRINKLING APPARATUS

[72] Inventors: Perry H. Brown, Pasadena; Paul C. Kernodle, Jr., Diamond Bar, both of Calif.

[73] Assignee: Irrigation and Power Equipment Inc., Greely, Colo.

[22] Filed: Oct. 8, 1970

[21] Appl. No.: 79,166

[52] U.S. Cl. ............................ 239/156, 239/161, 239/162, 239/177, 239/212
[51] Int. Cl. ........................................................ B05b 9/06
[58] Field of Search .................. 239/155, 156, 157, 160, 161, 239/162, 163, 177, 212

[56] References Cited

UNITED STATES PATENTS

| | | | |
|---|---|---|---|
| 3,394,729 | 7/1968 | Bower et al. | 239/212 X |
| 3,410,490 | 11/1968 | Smith | 239/212 |
| 3,464,626 | 9/1969 | Stamps et al. | 239/212 X |

*Primary Examiner*—Allen N. Knowles
*Assistant Examiner*—Reinhold W. Thieme
*Attorney*—Harris, Kiech, Russell & Kern

[57] ABSTRACT

A system for applying agricultural chemicals in small amounts over a large area. A low-capacity spray system carried on and operated by a high-capacity self-propelled sprinkling irrigation system. A group of oscillating spray arms carried on and spaced along an irrigation pipeline, the arms being oscillated and the spray being turned on by the irrigation pipeline motor control to provide spraying as the pipeline is moved.

12 Claims, 6 Drawing Figures

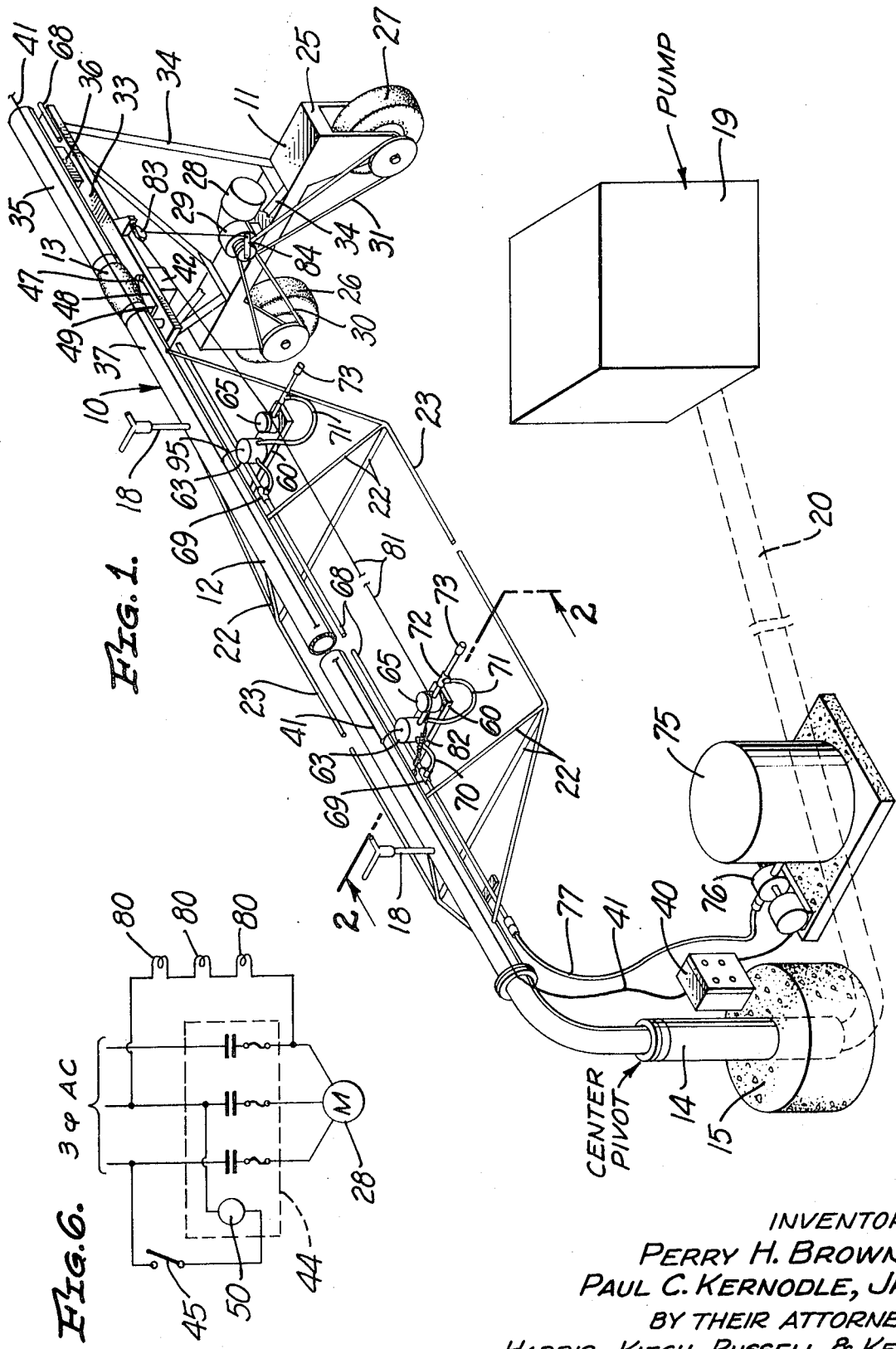

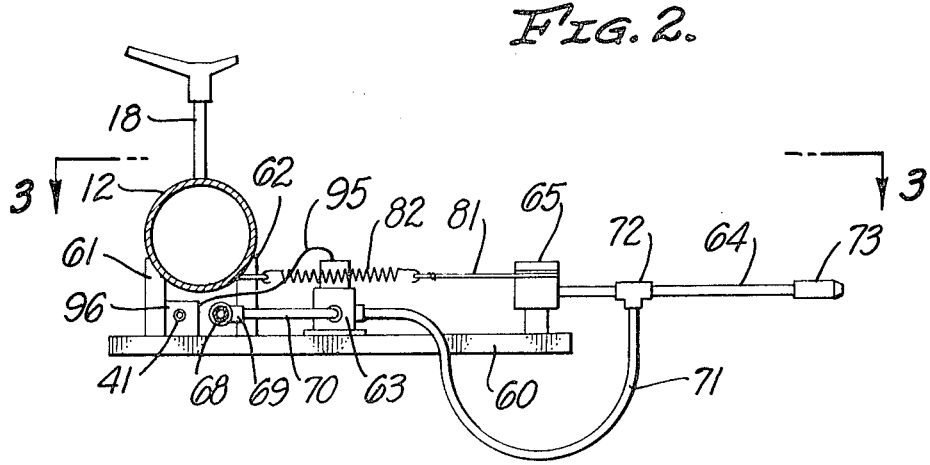
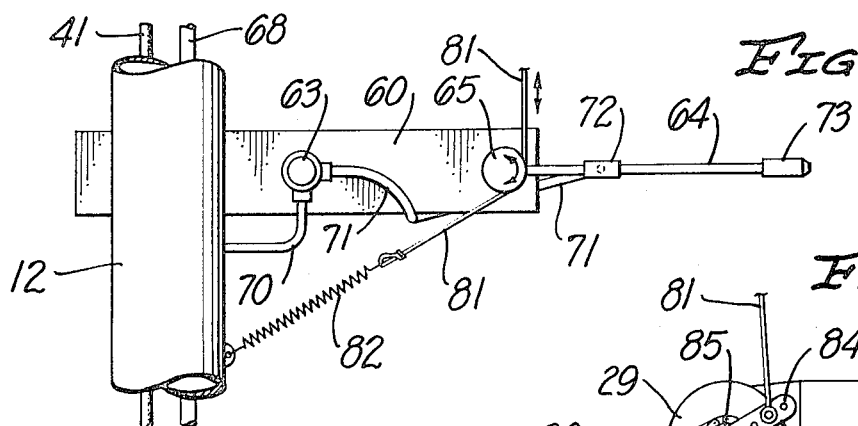
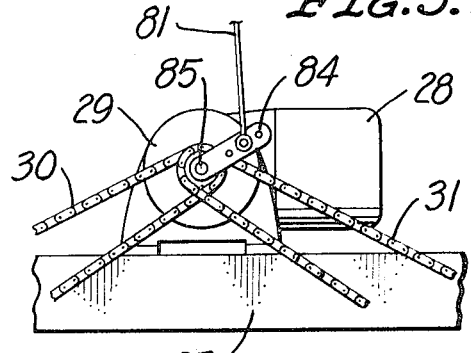
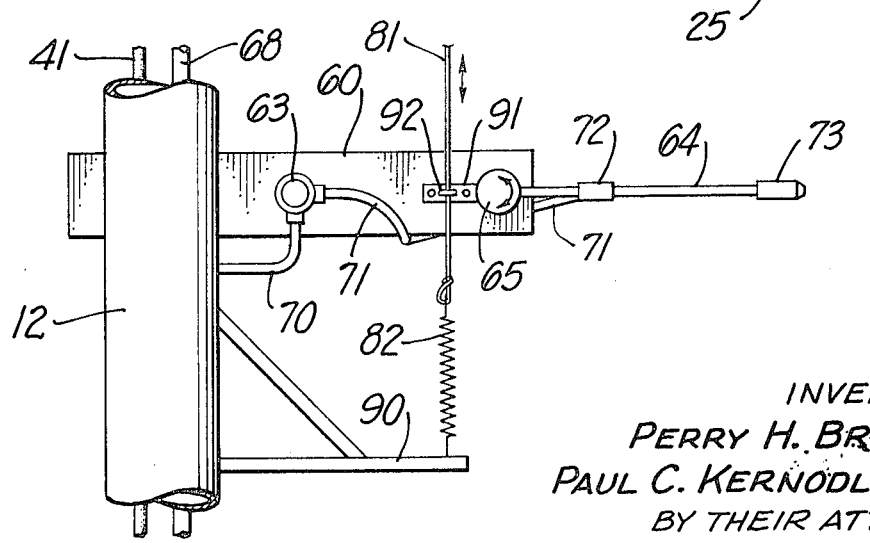
INVENTORS
PERRY H. BROWN,
PAUL C. KERNODLE, JR.
BY THEIR ATTORNEYS
HARRIS, KIECH, RUSSELL & KERN

CHEMICAL SOLUTION SPRAY SYSTEM FOR SELF-PROPELLED SPRINKLING APPARATUS

This invention relates to self-propelled sprinkling apparatus for agricultural uses and the like, and in particular to a new and improved system for spraying chemical solutions such as insectides, herbicides, fertilizer and the like at controlled uniform rates over wide areas.

Chemicals in liquid and solid form are widely used in agriculture for a variety of purposes and a number of different systems have been developed for the application of the various chemicals. One such system is dusting or spraying from low flying aircraft. Another is by means of a mist spray arrangement such as is shown in the Patent to Smith U.S. Pat. No. 3,410,490 wherein a large number of sprayers are spaced a short distance apart along a pipeline, typically at 15-inch intervals, to spray a low volume of chemical. Another system provides for mixing the chemical with the irrigation water for application with the irrigation water. A number of problems are encountered in this mode of treatment and one such solution is shown in the Stamps et al. U.S. Pat. No. 3,464,626.

Many of the agricultural chemicals are highly corrosive and cause damage to the irrigation system when mixed with the irrigation water. Also, the agricultural chemicals are utilized in relatively small amounts, typically 10 to 100 gallons per acre, in contrast to the high consumption of irrigation water, typically 30,000 gallons per acre for a comparable period of time. Obtaining the desired uniformity of distribution when such small amounts of chemical are mixed with such large amounts of water becomes very difficult if not impossible. Further, it is often desired that the chemical be deposited on the plant rather than on the ground and also that it be applied in a concentrated rather than diluted condition. All of these conditions mitigate against mixing the chemical with irrigation water.

Self-propelled sprinkling irrigation equipment which is automatically controlled to provide uniform distribution of water over wide areas are in general use and one such apparatus is shown in the U.S. Pat. to Bower et al., No. 3,394,729, and other forms are illustrated in the references cited in the Bower et al. patent. It is desirable to utilize the automatic self-propelled sprinkling system for use with the chemical spraying operation thereby obtaining both irrigation and chemical spray with one apparatus. It is an object of the present invention to provide a low capacity spraying system for agricultural chemicals and the like for use with a high capacity self-propelled irrigation system, with the chemical spraying system carried by and controlled by the irrigation system. A further object is to provide such a system wherein the chemical spray is completely independent of the irrigation spray permitting application of water and chemical independently and at various rates as desired and simultaneously when desired.

Other objects, advantages, features and results will more fully appear in the course of the following description. The drawings merely show and the description merely describes preferred embodiments of the present invention which are given by way of illustration or example.

In the drawings:
FIG. 1 is a perspective view of a portion of a self-propelled sprinkling apparatus incorporating a preferred embodiment of the present invention;
FIG. 2 is an enlarged sectional view taken along the line 2—2 of FIG. 1;
FIG. 3 is a sectional view taken along the line 3—3 of FIG. 2;
FIG. 4 is a view similar to that of FIG. 3 showing an alternative arrangement for coupling a nozzle arm to the cable; and
FIG. 5 is a side view of a portion of a carriage of the apparatus of FIG. 1 illustrating the drive motor.
FIG. 6 illustrates the motor starting circuitry.

A portion of a typical self-propelled sprinkling irrigation apparatus of the type shown in the aforementioned U.S. Pat. No. 3,394,729, is illustrated in FIG. 1. While the present invention is described and illustrated in conjunction with this particular sprinkling apparatus, it should be noted that the invention is not limited to this specific application and is readily adapted for use with a variety of sprinkling equipments. A pipeline 10 is supported on a plurality of motor driven carriages 11 which move the pipeline about the area to be irrigated. Typically, the pipeline may be formed of 12 or 14 lengths of pipe 12 joined at flexible couplings 13 to provide a pipeline in the order of quarter of a mile in length. The pipeline may be moved in a straight line or in a circular path and in the embodiment illustrated in FIG. 1, a circular path apparatus is provided with the inner end of the pipeline supported at a fixed pivot 14 mounted in a base 15 which may be set in the ground.

Sprinkling heads 18 are spaced along the pipeline, typically three or four heads between carriages and a pump 19 is connected to the pipeline via another line 20 and the center pivot to provide a supply of irrigation water to the sprinkling heads.

A typical sprinkling system will utilize 4-inch or 6-inch diameter pipe which when filled with water is relatively heavy and some form of truss or cable system is utilized to support the pipeline. A typical truss is illustrated in FIG. 1 with spreader bars 22 and cables 23.

The carriage 11 includes a frame 25 with wheels 26, 27 mounted thereon. An electric drive motor 28 is carried on the frame 25 and drives the wheels 26, 27 through a gear reduction unit 29 and endless belt chains 30, 31. A plate 33 is supported from the frame 25 on four angle bars 34. In the embodiment illustrated, the inner end 35 of one length of pipe is fixed to the plate 33 on a mounting block 36. The outer end 37 of the adjacent length of pipe is pivotally mounted on the plate 33.

Power for the electric motor 28 is provided from a control box 40 via an electrical cable 41 and a carriage motor control box 42. Each carriage control box includes a motor starter 44 and a cam operated switch 45 (FIG. 6). The switch 45 is operated by a cam carried on a rotating shaft 47, with the shaft being driven by a cable 48 connected to opposing ends of an arm 49 carried on the end 37 of the inboard length of pipe. The system is designed so that when the carriage is behind the desired position, the switch 45 is closed to energize the coil 50 of the starter 44 and close the contacts of the starter to apply power to the motor. The motor runs and drives the carriage wheels to move the carriage forward until the switch 45 is opened thereby deenergizing the motor. The drive motor of the outermost carriage of the pipeline is energized continuously so that the end of the pipeline moves at a desired constant rate. The remaining carriages are maintained in the desired alignment by the control system which energizes a particular motor when the particular carriage is lagging behind the desired alignment. The construction and operation of this system is described in detail in the aforesaid U.S. Pat. No. 3,394,729.

A plurality of chemical spray stations is positioned along the pipeline, typically with three stations between carriages, and a typical spray station is illustrated in FIGS. 2 and 3. A plate 60 is mounted on the pipe 12 by brackets 61, 62, typically by welding. A solenoid controlled valve 63 is mounted on the plate 60. An arm 64 is carried on a shaft 65 which is pivotally mounted on the plate 60.

A small chemical pipeline 68 is carried on the irrigation pipeline 10 and may be supported in various ways, as by clamping to the brackets 62. A T-fitting 69 is provided in the line 68 at each of the spray stations, with a conduit 70 between the T-fitting 69 and the solenoid valve 63 and with a flexible conduit 71 between the solenoid valve and another T-fitting 72 in the arm 64. A spray nozzle 73 is carried on the outer end of the arm 64.

Means are provided for introducing a fluid under pressure into the line 68 and typically may comprise a storage tank 75, motor driven pump 76 with pressure regulator, and conduit 77 connecting the pump outlet to the line 68. Power for the pump motor is provided from the control box 40. The solenoid of the valve 63 is connected to the cable 41 via another cable 95 at a junction box 96. The control circuitry provides for energizing the solenoid valves of the spray stations of a length of pipe at the time the drive motor for the carriage at the outboard end of such length of pipe is energized. By way of example, the spray stations on the length of pipe between the center pivot and the first carriage will have the solenoid valves thereof energized as a group when the drive motor of the first carriage is energized. Referring to FIG. 6, solenoids 80 are energized when the switch 45 closes, energizing starter coil 50 and closing the contacts of the starter 44.

Means are provided for oscillating the arms 64 of a group of spray stations when the solenoid valves are energized and the drive motor of the next outboard carriage is energized. In the embodiment illustrated in FIGS. 2 and 3, a cable 81 is connected via a spring 82 to the pipe 12. The cable 81 may be wrapped around the shaft 65 of each of the spray stations, passed through a pulley 83 supported from the plate 33 of the carriage 11, and have its other end fastened to a member 84 mounted on the output shaft 85 of the drive motor gear box 29. The spring 82 functions to maintain tension in the cable 81 and the drive motor 28 provides a cyclical pulling on the cable 81 via the crank member 84. Hence the motor operation provides for oscillation of an arm 64 when the motor is energized.

One alternative arrangement for driving the spray arm 64 is shown in FIG. 4, where parts corresponding to those of the embodiment of FIGS. 2 and 3 are identified by the same reference numerals. The spring 82 is anchored on a bracket 90 carried on the pipe 12. An extension 91 of the arm 64 carries a clamp 92 for clamping the cable 81 to the arm so that a reciprocating motion of the cable produces an oscillating motion of the arm. Other arrangements for coupling the drive motor to the spray arms can be utilized and an independent drive motor could be provided if desired. While an electrical drive system has been illustrated, it will be realized that the chemical spray system can also be used with hydraulically powered equipment.

In operating the system for irrigation, the outermost carriage drive motor is energized and its speed is set to provide the desired rate of travel, typically 1 revolution per 24 hours. The pump 19 is energized and irrigation water is provided to the pipeline under pressure with the water being distributed by the sprinkling heads. The intermediate carriage drive motors are energized intermittently as determined by the associated control circuit with the switch 45. Each intermediate carriage moves forward intermittently to maintain the desired alignment of the pipeline as the outermost carriage moves forward continuously.

The system may be operated in the same manner for chemical solution spraying by energizing the pump 76. If it is desired to apply the chemical solution at the same time as irrigation water is applied, the pump 19 is also energized. If it is desired to apply the chemical solution without irrigation water, the pump 19 is not energized when the pump 76 is energized. The solenoid valves for the spray stations of the outermost length of pipe will be energized and open all the time the outermost carriage is running and the arms of the spray stations will oscillate continuously. The solenoid valves and arms for intermediate lengths of pipe will be opened and oscillated, respectively, when the next outermost carriage drive motor is energized.

The chemical spray system provides for controlled uniform application of very small quantities of material over large areas. The chemical solutions such as insectides and herbicides are used in relatively low volumes, typically in the order of 10 to 100 gallons per acre per application. This is in contrast to irrigation water which may be applied at a rate of 30,000 gallons per acre. The chemical spraying system must provide for very low material handling while at the same time obtaining uniform coverage over wide areas. This desired result is achieved in the system of the present invention by utilizing a low capacity system with a small number of spray nozzles so that each nozzle will be delivering sufficient material for proper operation of the nozzle without requiring exceedingly fine holes and avoiding the associated clogging problems. The wide area coverage is achieved by oscillating the nozzles, typically in a generally semicircular arc and also by actuating the spray system only when the associated pipeline portion is moving.

The chemical spraying system of the present invention permits the use of conventional high capacity self-propelled irrigation apparatus for support and control. At the same time it provides for independent application of small quantities of material, which can be applied simultaneously with irrigation water or separate from irrigation water. The chemical spraying system may be made of stainless steel or other corrosion resisting material and yet be relatively inexpensive because of the small size as compared to the high capacity irrigation system.

Adjustments in the operation of the system are readily achieved. While the number of spraying stations is fixed once the system is built, the nozzles 73 may be changed to provide different spraying rates and patterns. Since there are only a few nozzles involved, this change is readily made. The rate of application of the chemical may also be controlled by varying the output pressure of the pump 76. The oscillation of the arms may be varied by changing the length of the crank arm at the drive motor, as by moving the coupling between the cable 81 and the member 84 from one opening to another along the member 84. The rate of travel of each carriage is a function of its radial distance from the pivot and the nozzle size for each individual arm normally would be different so as to provide a uniform application of solution from the center pivot to the outermost spraying station.

The system provides for automatic application of the chemical without requiring the presence of people and thereby eliminates labor costs and also exposure to materials. The use of the chemical spraying system in conjunction with the irrigation system provides for changing from one type of application to another at any time, without requiring moving of equipment and permits chemical treatment when conditions are most suitable such as at night or low wind conditions.

We claim:

1. In a self-propelled sprinkling irrigation system having a high capacity irrigation pipeline supported on a plurality of spaced motor driven carriages and control means for energizing the drive motors, a low capacity spraying system for insectides, herbicides, fertilizer and the like, comprising in combination:
   a low capacity pipeline supported at said high capacity pipeline;
   means for supplying a fluid under pressure to said low capacity line;
   a plurality of arms spaced along and pivotally supported at said high capacity line, with a spraying nozzle on each of said arms and with a group of arms associated with a carriage and drive motor;
   a control valve for each of said arms;
   conduit means connecting each of said valves between said low capacity line and the corresponding nozzle; and
   means for oscillating a group of said arms and actuating the control valves thereof as the associated drive motor is energized to spray fluid as the associated carriage moves.

2. A system as defined in claim 1 including bracket means carried on said high capacity pipeline for mounting each of said arms for pivoting in a generally horizontal plane, with the corresponding control valve mounted on the bracket means.

3. A system as defined in claim 1 in which said means for oscillating includes:
   a cable coupled to each of the arms of a group;
   means for applying a tension load at one end of said cable; and
   means for cyclically pulling at the other end of said cable.

4. A system as defined in claim 3 in which each of said arms is carried on a pivoting shaft and in which said cable is coupled to each arm at said shaft.

5. A system as defined in claim 3 in which said cable is coupled to each arm at a point spaced from the pivot point of the arm.

6. A system as defined in claim 3 in which said means for cyclically pulling comprises the carriage drive motor.

7. A system as defined in claim 6 including a member driven in rotation by said carriage drive motor and means for coupling said cable to said member.

8. In a self-propelled sprinkling irrigation system having a high capacity irrigation pipeline supported on a plurality of spaced motor driven carriages with an electrical switch at a carriage for energizing the carriage drive motor as a function of carriage position, a low capacity spraying system for insectides, herbicides, fertilizer and the like, comprising in combination:
   a low capacity pipeline supported at said high capacity pipeline;
   means for supplying a fluid under pressure to said low capacity line;
   a plurality of arms spaced along and pivotally supported at said high capacity line, with a spraying nozzle on each of said arms and with a group of arms associated with a carriage and drive motor;
   a solenoid actuated control valve for each of said arms;
   conduit means connecting each of said valves between said low capacity line and the corresponding nozzle; and
   means for oscillating a group of said arms and actuating the valve solenoids thereof to spray fluid when the associated drive motor is energized by the switch to move the carriage.

9. A system as defined in claim 8 in which said means for oscillating includes:
   a cable coupled to each of the arms of a group;
   means for applying a tension load at one end of said cable; and
   means for coupling the other end of said cable to the carriage drive motor for cyclically pulling said cable as said motor rotates.

10. In a self-propelled sprinkling irrigation system having a high capacity irrigation pipeline supported on a plurality of spaced motor driven carriages and control means for energizing the drive motors, a low capacity spraying system for insectides, herbicides, fertilizer and the like, comprising in combination:
    a low capacity pipeline supported at said high capacity pipeline;
    means for supplying a fluid under pressure to said low capacity line;
    a plurality of spray stations carried on said high capacity line at spaced intervals, each of said stations including a pivotally mounted arm with a nozzle, a control valve and a conduit means connecting each of said valves between said low capacity line and the corresponding nozzle; and
    means for oscillating a group of said arms and actuating the control valves thereof as a drive motor is energized to spray fluid as a carriage moves.

11. A system as defined in claim 10 in which a group of arms on a portion of the high capacity line are oscillated by the drive motor of the carriage which moves said portion of the high capacity line.

12. A system as defined in claim 11 in which said means for oscillating includes:
    a cable coupled to each of the arms of a group;
    means for applying a tension load at one end of said cable; and
    means for coupling the carriage drive motor to the other end of said cable for cyclically pulling said cable.

* * * * *